United States Patent [19]

Loth

[11] 4,045,144
[45] Aug. 30, 1977

[54] WIND ENERGY CONCENTRATORS

[76] Inventor: John Lodewyk Loth, P.O. Box 4094, Mogantown, W. Va. 26505

[21] Appl. No.: 550,841

[22] Filed: Feb. 18, 1975

[51] Int. Cl.² .................................................. F03D 1/04
[52] U.S. Cl. .......................................... 415/1; 415/2; 415/DIG. 1; 416/DIG. 4
[58] Field of Search ........................................ 415/2–4, 415/DIG. 1, 1

[56] References Cited

U.S. PATENT DOCUMENTS

| | | | |
|---|---|---|---|
| 762,315 | 6/1904 | Joyce | 415/3 |
| 981,077 | 1/1911 | Feldner | 415/2 |
| 1,595,578 | 8/1926 | Sovereign | 415/2 |
| 3,578,264 | 5/1971 | Knethe | 415/DIG. 1 |

FOREIGN PATENT DOCUMENTS

| | | | |
|---|---|---|---|
| 192,793 | 2/1923 | United Kingdom | 415/2 |

*Primary Examiner*—Everette A. Powell, Jr.
*Attorney, Agent, or Firm*—Schuyler, Birch, Swindler, McKie & Beckett

[57] ABSTRACT

The herein described horizontal and vertical wind energy concentrators are structurally simple and light and are capable of concentrating the wind energy at least six times with very high efficiency. This permits a corresponding reduction in the frontal area of the wind turbine and increases its speed without sacrifice in wind energy harnessed. The wind energy concentrator is a high lift, short aspect ratio wing, which is designed to maximize the induced drag. This induced drag takes the velocity out of the wind but transforms the wind energy into rotational energy present in the shed vortex system. The design is such that most of this rotational energy can be harnessed by a small high speed wind turbine placed in the rolled up wing tip vortex.

12 Claims, 7 Drawing Figures

HORIZONTAL WIND ENERGY CONCENTRATOR

HORIZONTAL WIND ENERGY CONCENTRATOR

VERTICAL WIND ENERGY CONCENTRATOR $C_{L MAX} = 2.5$ $C_{L MAX} = 3.0$ REF. 1

$C_{L MAX} = 4.0$ REF. 1

SUCTION THRU SLOT OR POROUS WALL $C_{L MAX} = 5.0$ REF. 2

$C_Q = .004$

COANDA BLOWING $C_{L MAX} = 5.0$  $C_\mu = .1$  REF. 2

WIND ENERGY CONCENTRATORS

BACKGROUND OF THE INVENTION

The following papers hereby are incorporated by reference. The materials contained in these papers are useful in optimizing the design of the airfoils included as part of the present invention.

1. Smith, A. M. O., "High Lift Aerodynamics," AIAA paper 74-939, August 1974.
2. Loth, J. L., "Some Aspects of STOL Aircraft Aerodynamics," SAE paper 730328, April 1973.
3. Loth, J. L. and Boyle, R. E., "Optimum Loading on Nonplanar Wings at Minimum Induced Drag," TR-19 Department of Aerospace Engineering, West Virginia University, AD704502, August 1969.
4. Chandra, S. and Loth, J. L., "Lifting Surface Analysis Using Chordwise Load Segments," TR-37, Department of Aerospace Engineering, West Virginia University, AD 775336, August 1973.
5. Wilson, J. D. and Loth, J. L., "Real Time Development of the Wake of a Finite Wing," TR-23, Department of Aerospace Engineering, West Virginia University, February 1974.

SUMMARY OF THE INVENTION

The horizontal and the vertical wind energy concentrators described here are capable of concentrating the wind energy into a small area. This reduces the required frontal area of the rotating wind turbine by at least six times. The efficiency of the concentration process can exceed unity when referenced to an area equal that of the concentrator. The concentrator is lighter and simpler to construct than a conventional propeller shroud and much more effective.

The operating principle is based on the property of high lift airfoils to have high induced drag which takes energy out of the wind and converts this to rotational energy. This energy is not dissipated near the wing but remains in the shed vortex system. The trailing vortex sheet rolls up rapidly and concentrates a large portion of the wind energy in the wing tip trailing vortex core. Due to the high angular velocity of this vortex the wind turbine can run at much higher than conventional speeds and the reduction in wind turbine frontal area significantly lowers the weight and cost of the system. The reduction in weight and size also reduces the problems associated with keeping the rotor aligned with the wind direction. The horizontal wind energy concentrator is more suitable for medium and small power plants while the vertical unit requires an airfoil thickness which is large enough to encase the cylindrical tower.

BRIEF DESCRIPTION OF THE DRAWINGS

The novel features of the invention are set out with particularity in the appended claims, but the invention will be understood more fully and clearly from the following detailed description of preferred embodiments of the invention as set forth in the accompanying drawings, in which:

DETAILED DESCRIPTION OF PREFERRED EMBODIMENTS

Figure 1:
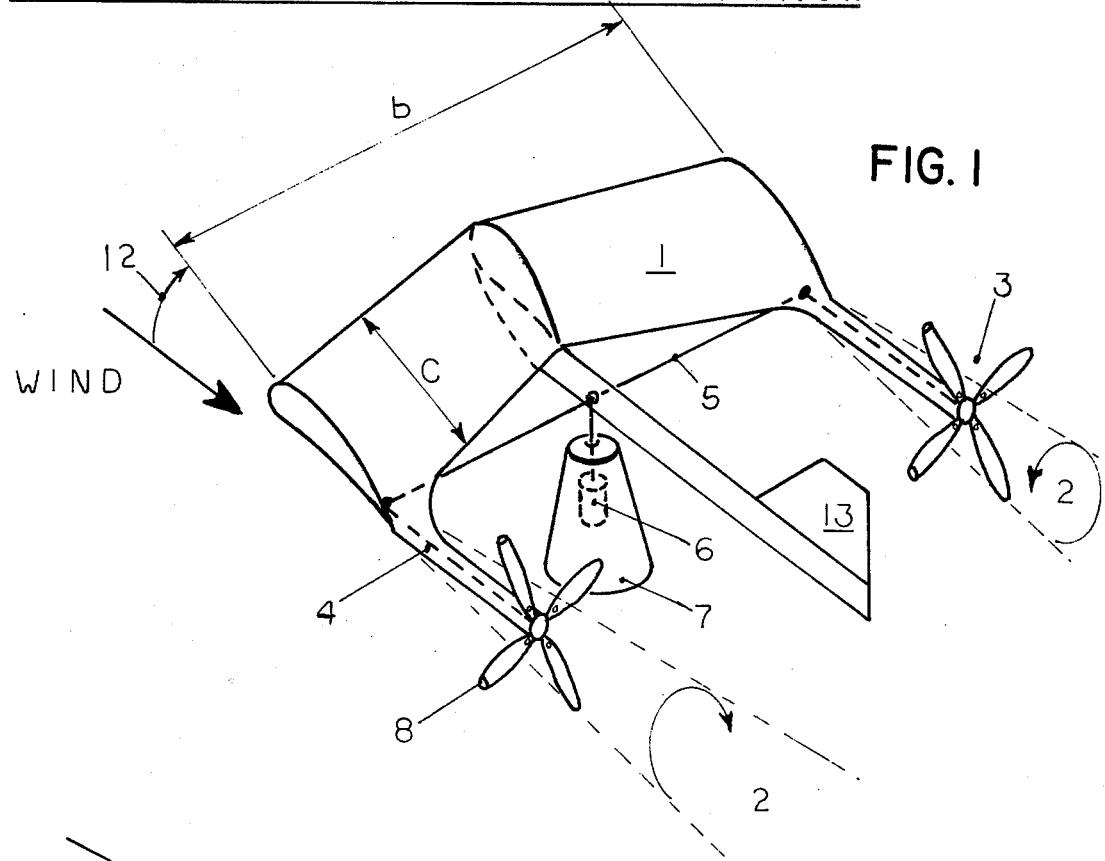
FIG. 1 is a perspective view of a horizontal wind energy concentrator according to a first embodiment of the present invention.
Figure 2:
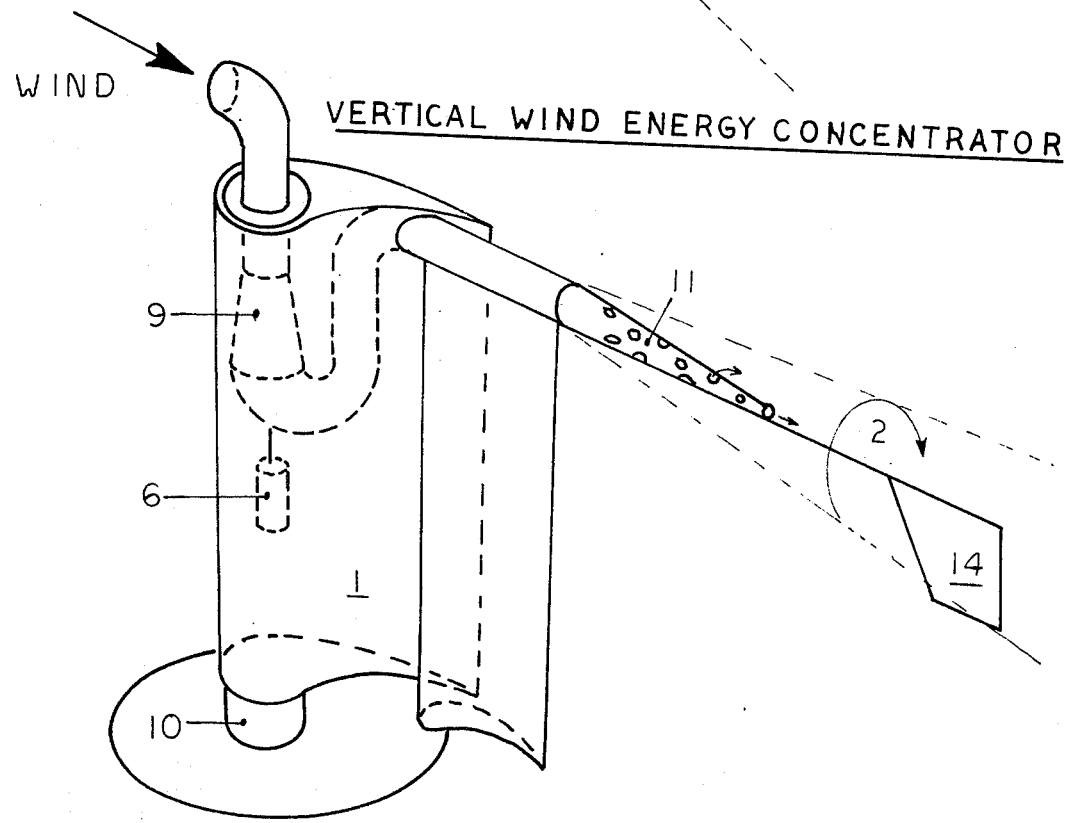
FIG. 2 is a perspective view of a vertical wind energy concentrator according to a second embodiment of the present invention.

FIG. 1 shows the assembly drawings of a horizontal full span and FIG. 2 a vertical semi-span version of a wind energy concentrator. The devices consist of a high lift, short aspect ratic wind 1 with planform area S. The lift induced drag takes the momentum out of the wind but converts the wind energy to rotational energy which leaves in the form of a shed vortex system. The wing is designed to have near uniform spanwise loading which causes the vortex sheet to roll up rapidly to form two strong counter rotating wing-tip vortices 2. For the semi-span version only one wing tip vortex is present. A high speed wind turbine 3 is placed in the center of each of these vortices. The turbine is supported by a wing strut 4 which positions the wind turbine at least one chord length downstream of the trailing edge in the center of the vortex core. The wind energy harnessed by the wind turbines can be in the form of shaft power. Appropriate shafts 5 can transfer the power to a generator 6 in the central vertical tower 7. The wind turbine shaft power can be increased by employing hollow blades 8. Because the turbine angular velocity is lower than the vortex, the radial pressure gradient in the hollow blades in less than that of the vortex. Extra power can be obtained by letting air flow inward through the blades to the vortex core, due to the corresponding loss in angular momentum. The wind energy could also be harnessed through the use of a constant speed turbine 9 as shown in the vertical wind energy concentrator tower 10. Turbine 9 is driven by a vacuum maintained at its exhaust. The vacuum is obtained by connecting the turbine exhaust to the high vacuum core of the vortex through holes in the strut 11. One can also generate power by using a wind turbine, similar to turbine 3, inside the vortex. The angle 12 between the chord of the wing and the wind direction is optimized so as to obtain maximum induced drag and thus rotational energy in the trailing vortex system. The horizontal full span version has to be kept aligned with the wind direction through the use of a vertical stabilizer 13. The vertical semi-span version has an airfoil pivoting around a cylindrical tower 10. The angle between the airfoil chord and the wind direction is maintained at the optimum angle of attack 12 through the use of a trim surface 14.

Figure 3:
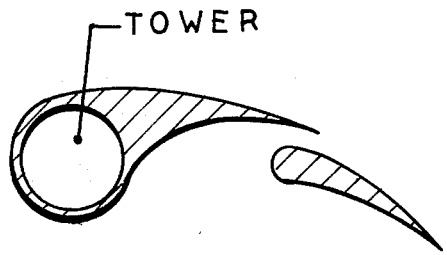
FIG. 3 is a cross-sectional view of a first airfoil for use in the wind energy concentrators of the present invention.
Figure 4:
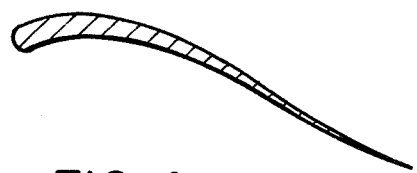
FIG. 4 is a cross-sectional view of a second airfoil for use with the wind energy concentrators of the present invention.
Figure 5:
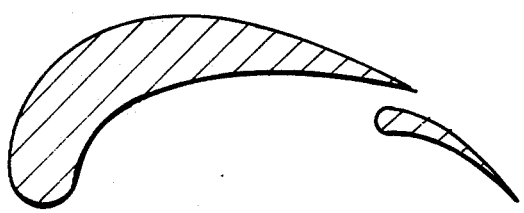
FIG. 5 is a perspective view of a third airfoil for use with the wind energy concentrators of the present invention.
Figure 6:
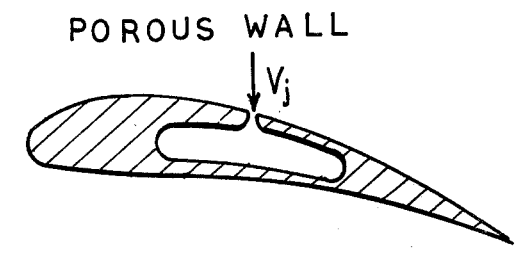
FIG. 6 is a cross-sectional view of a fourth airfoil for use with the wind energy concentrates of the present invention.
Figure 7:
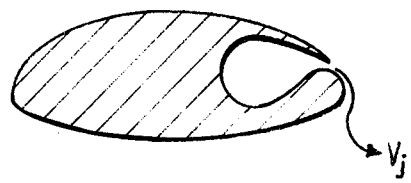
FIG. 7 is a cross-sectional view of a fifth airfoil adapted for use with the wind energy concentrators of the present invention.

FIGS. 3-7 shows five typical airfoil types which are applicable for use in the wind energy concentrator. FIG. 3 shows one method of modifying the vertical tower to a high-lift airfoil. FIG. 4 shows a light weight high lift airfoil geometry from Ref. 1. FIG. 5 shows a high lift and high drag airfoil geometry from Ref. 1 which is as effective but simpler than Handley Page's eight-element airfoil. The airfoil shown in FIG. 5 is considered most suitable for this application as high parasite drag does not affect its operation. FIG. 6 shows a powered high lift airfoil with boundary layer control through suction. Either a porous wall or a slot, located about midchord can be used to remove the boundary layer. FIG. 7 shows a powered high lift airfoil with circulation control by Coanda type blowing over a blunt trailing edge. This c.c. blowing requires about three times as much power as b.1.c. suction for obtaining the same $C_{L_{max}}$.

The horizontal and the vertical wind energy concentrators described here are designed to allow a significant reduction in the frontal area of the rotating wind turbine without reduction in the power harnessed.

Conventional shrouds can achieve a limited amount of wind energy concentration but their size and weight makes it difficult to keep them aligned with the wind direction. The concentrator described here is light and simple to construct and relatively easily oriented relative to the wind direction. The concentrator has a high lift, low aspect ratio, full span or semi-span wing as shown in FIG. 1, and a small high speed wind turbine downstream of each wing tip. Any finite lifting wing has its bound vorticity continued in the trailing vortex sheet. The trailing vortex sheet produces a downwash which rotates the relative wind and therefore the lift vector which has then a component in the in the direction of the wind which is called induced drag. Induced drag is then produced in addition to parasite drag. For aircraft both induced drag and parasite drag should be minimized. On the contrary for the wind energy concentrator, the induced drag is maximized and the magnitude of the parasite drag is irrelevent. Although the induced drag takes the momentum out of the wind, it does not dissipate the wind energy but transforms it into rotational energy in the trailing vortex sheet. By designing the wing to have a nearly uniform spanwise loading one increases both the induced drag and the wind energy present in the trailing vortex system. In addition the vortex sheet will roll up more rapidly near the wing tips and concentrate most of the rotational energy in a narrow strong wing tip vortex. It is in this vortex where one can harness the wind energy with a small high speed turbine because of the high angular velocity of the vortex. A high lift airfoil influences the air flow in a region much in excess of its planform area S. If the induced drag coefficient $C_{Di} = 1.0$, then the rotational energy in the trailing vortex sheet equals the reference wind energy which is present in a stream tube of cross sectional area S. Because $C_{Di}$ can exceed 1.0 it is possible to concentrate wind energy with an efficiency in excess of 1.0, see section "Theory of operation." If the airfoil is designed with nearly uniform span-wise loading then the majority of rotational energy is present in an area less than $c/2$ in diameter and depending on the aspect ratio, the wind energy concentration ratio can be at least six. For small power capacities the horizontal wind energy concentrator appears most suited. For very large power requirements the thickness of the vertical tower can be incorporated in the airfoil shape and a vertical design seems most suitable.

Both methods of power supply to the generator shown in FIG. 1 are applicable. The constant speed turbine design is only recommended when a constant R.P.M. drive is essential. For other cases the cross shafting using beveled gears appears most efficient.

THEORY OF OPERATION

Before showing the relations between the various design variables which control the performance of the wind energy concentrator a nomenclature is given:
 A: total frontal area of rotating wind turbines
 AR: wing aspect ratio $= b/c$
 b.l.c.: boundary layer control by suction
 b: wing span
 c: mean aerodynamic chord
 c.c.: circulation control by blowing over a blunt trailing edge
 $C_L$: overall average lift coefficient
 $C_{Di}$: overall average induced drag coefficient
 $C_Q$: b.l.c. suction coefficient $= \dot{m}/\rho VS$
 $C\mu$: c.c. blowing coefficient $= \dot{m}V_j/\tfrac{1}{2}\rho V^2 S$
 d: wind turbine diameter
 e: span-wise loading efficiency
 E: wind kinetic energy corresponding to wing area S equal $\tfrac{1}{2}\rho V^3 S$
 f: fraction of vortex rational energy intercepted by wind turbines
 $\dot{m}$: powered lift blowing or suction mass flow rate
 R: wind energy concentration ratio $= S/A$
 S: wing planform area $= b.c.$
 V: wind velocity
 $V_j$: blowing or suction jet slot velocity
 $\bar{V}$: blowing or suction velocity nondimensionalized by wind velocity
 $\rho$: air density
 $\eta B$: area ratio between wind capture area and wind turbine area A, this is less than 1.0 due to blockage
 $\eta c$: c.c. blowing air compressor and ducting efficiency
 $\eta$: ratio of wind energy intercepted by wind turbines to total wind energy E.

The kinetic energy available in the wind blowing through a stream tube with cross sectional area S is given by $$E = (\rho VS)\frac{V^2}{2} = \frac{1}{2}\rho V^3 S$$

The lift induced drag transforms the wind kinetic energy into rotational energy which is shed with the trailing vortex system. The rotational energy in the vortex system equals the wind energy dissipated. This is the product of the wind velocity and the induced drag force.

$$V \cdot C_{Di} \cdot S \cdot \tfrac{1}{2}\rho V^2 = C_{Di} E$$

When the induced drag coefficient equals 1.0 then 100% of the wind energy E is transformed into rotational energy. Even more than 100% of the wind energy E can be found in rotational energy of the trailing vortex system because the influence area of the wing far exceeds its planform area S. The vortex rotational energy increases with the average lift coefficient of the wing as given by $$C_{Di} \cdot E = \frac{C_L^2 \cdot E}{\pi\, AR\, e}$$

Here e is the spanwise loading coefficient which is minimized by twisting the wing to have near uniform spanwise loading. A large portion of the rotational energy is concentrated in the vortex core which is less than $c/2$ at a distance of $1c$ downstream of the trailing edge. The fraction of the rotational energy intercepted by the wind turbines is $$\frac{f \cdot C_L \cdot E}{\pi AR\, e}$$

The wind turbines of diameter $d$ and crossectional area $$A = 2\left(\frac{\pi}{4} d^2\right)$$

intercept direct kinetic wind energy equal $$\eta B \cdot \frac{A}{S} \cdot E \cdot = \frac{\eta B \cdot E}{R}$$

where R is the wind energy concentration ratio.

For unpowered airfoils the wind energy concentrator efficiency equals the wind turbine incident energy divided by E.

$$\eta = \frac{f \cdot C_L}{\pi AR\, e} + \frac{\eta B}{R}$$

Powered high lift airfoils such as shown in FIG. 2D employ boundary layer control through suction through a porous wall or upper slot as shown. This requires a suction power $$\dot{m}\frac{V_j^2}{2\eta C} = C_Q \cdot \rho V S \cdot \frac{V_j^2}{2\eta c} = E \cdot C_Q \frac{\hat{V}^2}{\eta c}$$

this reduces the efficiency $\eta$ to:

$$\eta = \frac{fC_L}{\pi AR\, e} + \frac{\eta B}{R} - C_Q \frac{\hat{V}^2}{\eta c}$$

Powered high lift airfoils such as shown in FIG. 2E employ circulation control through blowing over a blunt trailing edge which requires blowing power in the amount $$\dot{m}\frac{V_j^2}{2\eta_c}$$

$$\dot{m}\frac{V_j^2}{2\eta c} = C\mu \cdot \frac{1}{2}\rho V^2 \cdot S \cdot \frac{V_j}{2\eta C} = \frac{C\mu \hat{V} E}{2\eta c}$$

this reduces the efficiency $\eta$ to $$\eta = \frac{f \cdot C_L}{\pi AR\, e} + \frac{\eta B}{R} - \frac{C\mu \hat{V}}{2\eta c}$$

The wind turbine diameter $$d = \sqrt{\frac{2A}{\pi}} = c\sqrt{\frac{2AR}{\pi R}}$$

Typical wind energy concentration efficiencies are compiled below for type the airfoils shown in FIGS. 3–7. The calculations are based on an aspect ratio $AR=5$, and wind energy concentration ratio $R=6$. This results in a wind turbine diameter $d=0.7c$. All coefficients used are typical experimentally obtainable. The spanwise loading efficiency $e=0.7$, the fraction intercepted $f=0.6$ with efficiency $\eta B = 0.7$. For powered airfoils $\eta c=0.6$ and $\hat{V}=4$ for a FIG. 3 airfoil find $\eta=0.46$
for a FIG. 4 airfoil find $\eta=0.61$
for a FIG. 5 airfoil find $\eta=1.00$
for a FIG. 6 airfoil find $\eta=1.38$
for a FIG. 7 airfoil find $\eta=1.15$

I claim:

1. A wind energy concentrator, comprising:
   a. an airfoil for generating a trailing vortex system, said airfoil being constructed to concentrate a substantial portion of the rotational energy of said trailing vortex system into a rolled-up vortex at a predetermined spanwise location along said airfoil;
   b. a turbine disposed outside said rolled-up vortex;
   c. a duct means for providing fluidic communication between said turbine and said rolled-up vortex to extract power therefrom, said fluidic communication being established within said rolled-up vortex; and
   d. an air inlet provided for said turbine, whereby said rolled-up vortex creates a low pressure region within said duct means to cause air to be drawn through said air inlet and past said turbine thereby to drive said turbine.

2. The apparatus of claim 1, additionally comprising a drive means operatively connected to said turbine for providing shaft power upon the actuation of said turbine.

3. The apparatus of claim 2, additionally comprising a stabilizing means operatively connected to said airfoil for aligning said airfoil so that the leading edge thereof faces into the prevailing wind.

4. The apparatus of claim 1 wherein said turbine is disposed within said airfoil.

5. A wind energy concentrator, comprising:
   a. an airfoil for generating a rolled-up vortex, said airfoil comprising a high lift, low aspect ratio, twisted wing having a substantially uniform spanwise loading and an increasing angle of attack toward the tips thereof, whereby the induced drag generated by said airfoil is maximized and said wing operates substantially at a maximum coefficient of lift along the entire span thereof;
   b. a turbine disposed within said rolled-up vortex to extract power therefrom;
   c. a drive means operatively connected to said turbine for providing shaft power upon actuation of said turbine;
   d. a strut affixed to said airfoil to support said turbine substantially centrally within said rolled-up vortex; and
   e. a stabilizing means operatively connected to said airfoil for aligning said airfoil so that the leading edge thereof faces into the prevailing wind.

6. The apparatus of claim 5, wherein said airfoil also includes a boundary layer control means.

7. The apparatus of claim 6, wherein said boundary layer control means comprises:
   a. a perforated portion on the upper surface of said airfoil; and
   b. a suction means in fluidic communication with said perforated portion for drawing air through said perforated portion to control the boundary layer on said airfoil.

8. The apparatus of claim 7, wherein said suction means comprises a duct means in fluidic communication with said rolled-up vortex, whereby said rolled-up vortex creates a low pressure region within said duct means to cause air to be drawn through said perforated portion.

9. The apparatus of claim 6, wherein said boundary layer control means comprises:
  a. a perforated portion on the upper, rear surface of said airfoil; and
  b. blowing means in fluidic communication with said perforated portion for blowing air through said perforated portion and over the trailing edge of said airfoil to increase the lift coefficient of said airfoil.

10. A method for concentrating wind energy, comprising the steps of:
  a. generating a trailing vortex system by means of an airfoil;
  b. concentrating a substantial portion of the rotational energy of said trailing vortex system into a rolled-up vortex at a predetermined spanwise location along said airfoil;
  c. disposing a power means outside said rolled-up vortex;
  d. providing a duct means to establish fluidic communication between said power means and said rolled-up vortex; and
  e. extracting power from said rolled-up vortex by actuating said power means by airflow therepast in response to a low pressure region created in said duct means by said rolled-up vortex.

11. The method of claim 10, comprising the additional steps of:
  a. constructing said power means as a turbine;
  b. transmitting shaft power by a drive means operatively connected to said turbine; and
  c. aligning said airfoil so that said faces into the prevailing wind.

12. The method of claim 11, wherein said turbine is disposed within said airfoil.

* * * * *